United States Patent [19]
von Bonin et al.

[11] Patent Number: 5,709,821
[45] Date of Patent: Jan. 20, 1998

[54] GEL FORMERS HAVING REDUCED GELLING TIME AND FORMING GELS WITH IMPROVED MELTING RESISTANCE

[75] Inventors: Wulf von Bonin, Odenthal; Roland Leroux, Stadecken-Elsheim; Markus Steigenberger, Bischofsheim; Thomas Karschti, Budenheim; Markus Ring, Westhofen, all of Germany

[73] Assignees: Bayer Aktiengesellschaft, Leverkusen; Schott Glaswerke, Mainz, both of Germany

[21] Appl. No.: 587,197

[22] Filed: Jan. 16, 1996

[30] Foreign Application Priority Data

Jan. 23, 1995 [DE] Germany .................. 195 01 839.7
Feb. 2, 1995 [DE] Germany .................. 195 03 283.7

[51] Int. Cl.⁶ .............. B01J 13/00; C09K 21/00; C04B 16/00
[52] U.S. Cl. ............... 252/315.01; 252/315.1; 252/315.2; 252/606; 252/611; 252/378 R; 106/18.13; 106/18.15; 156/99; 427/165
[58] Field of Search ............... 252/408, 409, 252/315.1, 315.2, 315.01, 606, 611, 378 R; 106/18.13, 18.15; 428/426, 427, 432, 428, 921; 156/99, 109; 427/165, 376.2, 384, 389.7, 393.3

[56] References Cited

U.S. PATENT DOCUMENTS

| | | | |
|---|---|---|---|
| 4,127,157 | 11/1978 | Gardikes et al. | 106/38.3 |
| 4,209,056 | 6/1980 | Gardikes et al. | 106/38.3 |
| 4,288,491 | 9/1981 | Surzhenko et al. | 428/332 |
| 4,913,847 | 4/1990 | Tünker | 252/606 |
| 5,151,225 | 9/1992 | Herndon et al. | 252/607 |
| 5,156,775 | 10/1992 | Blount | 252/609 |
| 5,182,049 | 1/1993 | von Bonin | 252/378 R |
| 5,328,719 | 7/1994 | von Bonin | 427/165 |
| 5,425,901 | 6/1995 | von Bonin et al. | 252/610 |
| 5,543,230 | 8/1996 | von Bonin et al. | 428/432 |
| 5,573,706 | 11/1996 | von Bonin | 252/315.01 |
| 5,580,661 | 12/1996 | von Bonin et al. | 428/427 |

FOREIGN PATENT DOCUMENTS

| | | |
|---|---|---|
| 0596322 | 5/1994 | European Pat. Off. . |
| 0596324 | 5/1994 | European Pat. Off. . |
| 2382959 | 10/1978 | France . |
| 4140966 | 6/1993 | Germany . |

*Primary Examiner*—Joseph D. Anthony
*Attorney, Agent, or Firm*—Sprung Kramer Schaefer & Briscoe

[57] ABSTRACT

Gel formers comprising acid aluminum phosphate and a reaction product of boric acid and an alkanolamine, and further comprising alkali metal compounds in the aluminum: alkali metal ratio of 1:1.3–2.5 require short gelling times, and form gels having improved melting resistance.

10 Claims, No Drawings

GEL FORMERS HAVING REDUCED GELLING TIME AND FORMING GELS WITH IMPROVED MELTING RESISTANCE

EP-A 1 596 324 describes gel formers and EP-A 1 596 322 describes fire-resistant glass containing gels obtained from such gel formers, with the gel formers being characterized in that they contain a) acid aluminium phosphates, optionally in the form of reaction products with from 0.01 to 4 mol of alkanolamine per mole of aluminium phosphate and b) reaction products of boric acid with alkanolamines, with a) and b), calculated as solids, being present in a weight ratio of from 100:50 to 100:0.5. Preference is here given to gel formers containing from about 0.5 to 85% by weight of water and aluminium, boron, phosphorus and alkanolamine in atomic or molar ratios of 1:1.2–1.8:2.3–3.7:2.3–3.7. In addition to aluminium compounds, up to 20 mol %, based on aluminium, of metal compounds can be used, e.g. those from the first main group of the Periodic Table of the Elements. This corresponds to an atom ratio of aluminium to additional metal of 1:0.0–0.2.

These known gel formers have pH values in the range from 5 to 6 and require gelling times of from 3 to 80 hours at from 45° to 120° C., preferably from 10 to 40 hours at from 60° to 95° C.

It has been found that these known gel formers are not fully satisfactory in respect of their temperature resistance and adhesion to glass. Additions of alkali metal hydroxides in the range up to 20 mol % (based on aluminium) lead to considerable lengthening of the already long gelling times (see Example 2, sample B).

In addition, it has been found that for the application in fire-resistant glass an intermediate intumescence capability of the gels is better than a very high intumescence capability, since if excessive foaming occurs in case of fire, there is a danger of premature breaking of fire-resistant glazing. In the case of the known gels, such a premature breaking can not always be ruled out.

In the range from 300° to 500° C., the known gels have a good melting resistance. However, at lower temperatures undesired melting can occur which can lead to a premature flowing away of the gel if in the case of fire higher temperatures occur at the fire-resistant glass only after a relatively long time.

The present invention provides gel formers containing
 a) acid aluminium phosphates, optionally in the form of reaction products with from 0.01 to 4 mol of alkanolamine per mole of aluminium phosphate and
 b) reaction products of boric acid with alkanolamines,
which are characterized in that a) and b), calculated as solids, are present in a weight ratio of from 100:95 to 100:0.5 and that they additionally contain alkali metal compounds in an atom ratio of aluminium to alkali metal of 1:1.3–2.5.

The gel formers of the invention preferably contain from 0.5 to 85, in particular from 20 to 50, % by weight of water.

Furthermore, preference is given to gel formers containing aluminium, boron, phosphorus, alkanolamine and alkali metal in atomic or molar ratios of 1:1.2–1.8:2.7–3.3:2.7–3.3:1.4–2.2.

The reaction components used for the preparation of gels according to the invention are preferably aluminium hydroxide, orthophosphoric acid, orthoboric acid, monoethanolamine and alkali metal hydroxide.

Gel formers according to the invention can be prepared, for example, by first preparing a gel former corresponding to EP-A 1 596 324 (hereinafter also referred to as preproduct) and adding the alkali metal compound in the desired amount to this at from 10° to 100° C. This preparation is preferably carried out at from 20° to 60° C., with good stirring and using from 50 to 70, in particular from 30 to 55, % strength by weight aqueous solutions of the alkali metal compounds.

Fire-resistant gels according to the invention are gel formers according to the invention in gelled form. Fire-resistant gels according to the invention can be prepared, for example, by heating gel formers according to the invention to from 50° to 120° C. Heating is preferably to from 50° to 100° C., in particular from 70° to 95° C. Gelling generally occurs in a time between 30 minutes and 2.5 hours. It is advantageous to then allow the gels to mature for a further time, i.e. for example, to hold the gels at elevated temperature for a further period of from 10 to 20 hours. The supply of heat for the gelling and optionally maturation can, for example, occur in a circulated-air oven or by means of microwaves or alternating fields. Even if the total treatment time is not necessarily shorter than hitherto, the gel former does lose its flowability in a shorter time.

Fire-resistant glass according to the invention contains fire-resistant gels according to the invention. Fire-resistant glass according to the invention can be produced, for example, by allowing the above-described gelling and optionally maturation of the gel formers according to the invention to proceed between the panes of a composite pane consisting of two or more panes.

Gel formers according to the invention can be prepared, for example, by first reacting an aluminium compound capable of forming aluminium phosphate, in particular aluminium hydroxide, and a phosphorus compound capable of forming aluminium phosphate, in particular orthophosphoric acid, in the desired atom ratio of aluminium to phosphorus in the presence of water at, for example, from 70° to 120° C. to give an aluminium phosphate solution. This solution can, for example, have a solids content of at least 40% by weight, preferably from 70 to 85% by weight. This solution is preferably allowed to stand for at least 4 hours, better from 10 to 40 hours, at from 10° to 40° C. Separately therefrom, a boron compound capable of forming an alkanolamine salt, in particular orthoboric acid, and an alkanolamine, in particular ethanolamine, can then be combined in the desired ratio of boron atoms to alkanolamine molecules (e.g. 2 mol of alkanolamine per boron atom) in the presence of water and the, preferably aged, aluminium phosphate solution can then be added to this solution in the desired ratio. Moderate heating too, for example, from 50° to 85° C. then gives a preproduct of gel formers of the invention. After cooling to, for example, below 45° C., this has a good shelf life and a low viscosity.

From the preproduct, gel formers according to the invention can be obtained by addition of alkali metal compounds in the above-described manner.

If the gel formation is carried out at temperatures above 100° C., it may become necessary to carry out the gelling in a closed system. The gel formation can be carried out directly with freshly prepared gel former. However, it is preferable to store the gel former for at least 24 hours at room temperature prior to gel formation.

The boron-alkanolamine solution can contain, for example, from 40 to 100% by weight of solids and the aluminium phosphate solution is preferably, optionally after appropriate dilution, likewise as a solution containing from 40 to 75% by weight of solids combined with the boron-alkanolamine solution.

The individual components can also be combined in a different manner, for instance when the preparation is to be carried out completely or partially continuously and/or in a single-vessel process. For example, it is possible to first react the aluminium phosphate solution with the alkanolamine and then add the boron compound or first react the boron and/or phosphorus compound with an alkanolamine and then add, for example, freshly precipitated aluminium hydroxide.

In place of the two-vessel process which is preferably used and in which an aluminium phosphate solution and a boron-alkanolamine salt solution are first prepared and the two solutions are then combined by stirring together or in a continuous mixing apparatus, it is also possible to use single-vessel processes.

In the preparation of the gel former, it is also possible to initially use high solids concentrations and to then reduce these by dilution before, during or after the preparation of the gel former.

If desired, it is also possible to add additives, for example surfactants, bonding agents, colorants, pore nucleus formers, fillers, light protection agents, antioxidants and/or reinforcers, to the starting materials for preparing gel formers according to the invention and/or to the gel formers according to the invention. Such additives are known per se.

Gel formers according to the invention have a good shelf life at temperatures of up to about 40° C. Fire-resistant gels according to the invention are formed as clear, temperature-stable gels which are characterized by a good mechanical durability and, surprisingly, do not tend to flow at temperatures in the range from 100° to 600° C.

Unlike the previously known gel formers which contain no addition of alkali metal compounds or amounts of alkali metal compounds smaller than those required according to the invention, gel formers according to the invention gel, for example at 90° C., in less than 2 hours without having an unsatisfactorily short shelf life at room temperature. The shelf life at 20° C. is, for example, over 1 month, with the viscosities remaining below those of the known gel formers having a comparable solids content. The shorter gelling times have the advantage that the liquid gel former state which requires fixing of the composite panes containing it lasts for only a short time.

As already stated, fire-resistant gels according to the invention do not, even at temperatures in the range from 100° to 300° C., tend to form a flowing melt which may be able to flow out of the cracks in the covering glass panes which are unavoidably formed on the flame side when a flame is applied to fire-resistant composite glass. This is a technically important, surprising advantage of the fire-resistant gels of the invention.

Fire-resistant gels according to the invention have a fine-pored, moderate intumescence. The gel formers of the invention have relatively low viscosities, even at solids concentrations of above 60% by weight. Even at dilutions to a solids content of less than 40% by weight they are still capable of gelation and generally have somewhat more basic pH values than known gel formers, for example ones between 7 and 8.6. Fire-resistant gels according to the invention have a significantly reduced crack-forming tendency and tend not to flow even at temperatures up to 180° C., so that the hydrostatic pressure of the composite panes can be readily accommodated even in the case of relatively weak glass panes. Besides the good storage stability at constant, even elevated temperatures, fire-resistant gels according to the invention also have a good thermal shock resistance, for example in the case of temperatures fluctuating between −20, +20 and +80° C. Finally, the high F and G endurance times which the fire-resistant glass of the invention can have are worthy of mention.

The fire-resistant glass of the invention can be produced by first preparing a gel former which is storage-stable at room temperature and which can then, after being placed between the glass panes, be converted into the stable gel in a short time by heating without further additives. In the case of fire-resistant glass according to the invention the intumescence of the gels in case of fire is not so high as to result in premature breaking of the fire-resistant glazing.

The sum of these advantages of the present invention represents a considerable technical advance in the field of fire protection.

In the preparation of fire-resistant gels according to the invention, it is also possible to use, if desired in addition to or in place of the preferred aluminium hydroxide, other aluminium compounds which can be converted into aluminium phosphates, for example aluminium oxides, hydrated aluminium oxides, aluminium salts of volatile acids (for instance aluminium chloride, carbonates or acetates) and/or aluminium borate.

In addition to or in place of the preferred orthophosphoric acid, it is also possible to use, for example, other phosphorus compounds which can be converted into aluminium phosphates, for example dehydrated forms of orthophosphoric acid, phosphorus oxides, phosphonic acids, phosphinic acids, phosphoric esters and/or salts of phosphoric acid, the latter, for example, as ammonium and/or alkanolamine salts.

In addition to or in place of the preferred orthoboric acid, it is possible to use, if desired, other boron compounds, for example dehydrated forms of orthoboric acid, boron oxides, ammonium borates and/or alkanolamine borates.

In addition to or in place of the preferred ethanolamine, it is possible to use, if desired, other alkoxylation products of ammonia such as diethanolamine and/or triethanolamine.

Preferred alkali metal compounds are alkali metal hydroxides, particularly in the form of aqueous solutions. The alkali metal in the alkali metal compounds is preferably sodium. However, lithium, potassium and higher alkali metals are also suitable. In addition to or in place of the preferred alkali metal hydroxides, it is also possible to use other alkali metal compounds, for example oxides, carbonates, bicarbonates, formates, acetates, alkoxides, borates and/or aluminates.

Suitable glass for fire-resistant glass according to the invention may be, for example, any inorganic or organic glass of the prior art.

The gel formers can, if desired, be diluted prior to gel formation. The preferred diluent is water, but an addition of organic solvents, at least in part, is also possible, with the organic solvents preferably being miscible with water, but possibly also being immiscible with water.

Apart from the above-mentioned additives, it is also possible to use additions of carbonizing polyalcohols, for example sugars, glycols, glycerol, pentaerythritol and/or polyvinyl alcohols and other water-soluble oligomeric or polymeric additives. In specific cases, if clear gel layers are not required, polymer dispersions and/or preferably silica sols can also be mixed with fire-resistant gels or gel formers according to the invention. Bonding agents, surfactants, light-stabilizers, UV and IR filter substances and colouring additives are optionally added in amounts of, for example, below 3% by weight, preferably below 1% by weight, based on the fire-resistant gel of the invention. Fillers and carbonizing additives can optionally be used, for example in amounts of from 1 to 75% by weight, preferably from 20 to 60% by weight, based on the total mixture.

It is extremely surprising that use of the amounts according to the invention of alkali metal compounds changes the use properties of the gel formers, fire-resistant gels and fire-resistant glass in such an advantageous manner, since smaller additions of alkali metal compounds result in occurrence of serious disadvantages in use, in particular a poorer ability to gel.

Gel formers according to the invention can also be used for producing auxiliaries, materials and components for preventive fire protection, for example by impregnating absorptive substrates, for instance powders, fibrous materials, foam materials, cellulose materials, papers, nonwovens, woven or knitted fabrics, with gel formers according to the invention and then, optionally after shaping, carrying out the gelation. This gives, with or without partial or complete drying, materials which have a good fire-resistant action, intumescent character and are able to be ceramicized. Thus, gel formers according to the invention can be used, for example, for producing protective housings for cables, flame-resistant wound coverings, fillings for hollow spaces, sealing elements and fire barriers.

Gel formers according to the invention can also be used as additives or formative components in the production of more time-resistant polyurethane foams.

Of interest in preventive fire protection or in the production of mouldings or light materials is the combination of gel formers and fire-resistant gels according to the invention with expandable materials, e.g. expandable silicates or graphites, in unexpanded, partially expanded or completely expanded form, for example by admixing such graphites and/or silicates with fire-resistant gels or gel formers according to the invention and optionally subjecting this mixture to a shaping process and/or a thermal post-treatment, e.g. between 80° and 1000° C.

It is also possible to use fire-resistant gels according to the invention in comminuted form or gel formers in spray-dried form or in the form of material pulverized after drying, in massive form or (as a result of its intumescent property) partially or completely thermally expanded form as insulating and fire-resistant hollow space filling, as filler, as coating or pressed into plates or mouldings of another type, preferably for purposes of fire protection.

Since the gel formers of the invention have film-forming character, they are suitable not only as impregnants, but also, in particular in the case of water contents of from 10 to 50% by weight, as varnishes or coatings on rigid or flexible substrates and give these, for instance metals (such as aluminium), wood, woven fabrics, ceramics or plastics, an improved fire resistance.

The invention is illustrated below by way of example. Unless otherwise indicated, parts and percentages are by weight.

EXAMPLES

Example 1

Preparation of an alkali metal-free preproduct (not according to the invention)

a) Preparation of an aluminium phosphate solution 3045 parts of technical-grade orthophosphoric acid (85% strength) were heated with 726 parts of water to 80° C. 686.5 parts of aluminium oxide were then added continuously over a period of 1 hour while stirring. the mixture was stirred further for 45 minutes at 95° C. and was then cooled.

b) Preparation of an alkanolamine borate solution 1600 parts of ethanolamine and 24 parts of water were stirred with 742 parts of technical-grade orthoboric acid at 80° C. After 30 minutes, a clear solution had formed. The solution was then cooled to 40° C.

c) 4052 parts of solution prepared as described under a) were metered continuously over a period of 1 hour into the solution freshly prepared as described under b) with good stirring. The mixture was then stirred further for 2 hours at 90° C. and was then cooled over 30 minutes to below 40° C. The preproduct obtained (solution in water, pH: 6.4) was colourless and clear and represented an aqueous solution having a strength of about 69%.

Example 2

Additions of alkali metal hydroxide to the preproduct obtained as described in Example 1

500 parts of the preproduct obtained as described in Example 1 were in each case stirred with increasing amounts of 50% strength aqueous sodium hydroxide solution at 40° C. (for details see Table 1).

The various preparations formed clear solutions. They were introduced into test tubes in such a way that the tubes were filled to about 20% by volume. The tubes were then laid at an angle in an oven (90° C.), left there for 24 hours and the time at which gelling commenced was observed (for details see Table 1).

The tubes were subsequently taken from the oven, stood vertically and their contents were assessed at room temperature (for details see Table 1).

TABLE 1

| Sample | Addition of aqueous NaOH parts | atom ratio Al:Na | Commencement of gelling after (M = minutes, H = hours) | State after taking a sample from the oven and cooling |
|---|---|---|---|---|
| A | — | — | 6 H | clear, solid gel; crack-free |
| B | 10 | 1:0.2 | 12 H | clear, solid gel; crack-free |
| C | 20 | 1:0.4 | 31 H | clear, solid gel; crack-free |
| D | 25 | 1:0.5 | — | turbid liquid |
| E | 30 | 1:0.6 | — | turbid liquid |
| F | 40 | 1:0.8 | — | turbid liquid |
| G | 30 | 1:1 | — | clear liquid |
| H | 60 | 1:1.2 | — | clear, high-viscosity liquid |
| I | 70 | 1:1.4 | 5 H | clear, solid gel, crack-free |
| K | 75 | 1:1.5 | 2 H | clear, solid gel, crack-free |
| L | 80 | 1:1.6 | 80 M | clear, solid gel, almost crack-free |
| M | 90 | 1:1.8 | 60 M | clear, solid gel; cracks |
| N | 100 | 1:2.0 | 40 M | clear, solid gel; cracks |

The samples A and B correspond to the prior art, the samples C to H are for comparative purposes and the samples I to N correspond to fire-resistant gels according to the invention.

Table I shows that good gels are obtained in accordance with the prior art after a relatively long time (samples A and B). With increasing additions of sodium hydroxide solution, the gelling time then increases greatly (sample C), subsequently no gelling at all is obtained (samples D to H). From sample I, gels then occur again, and these gel after a very short time.

The increase in the amount of alkali metal (atom ratio of aluminium to alkali metal of up to 1:1.2) thus first increasingly leads to unusable products. Completely surprisingly, even higher amounts of alkali metal (atom ratio of aluminium to alkali metal from 1:1.3) give properties having very favourable use properties.

Example 3

The melting resistance at from 160° to 165° C. of gels obtained as described in Example 2 was tested as follows:

A sample of the respective gel was introduced into a test tube in such a way that it adhered to the wall of the test tube when this was stood vertically and the bottom of the test tube was partly free. The test tubes were then, in a vertical position, exposed for 5 minutes to a stream of air at 165° C. Gels which melted collected in a readily visible manner at the bottom of the test tube.

A test temperature of from 160° to 165° C. was selected because in the testing of fire-resistant glass in a furnace in accordance with DIN 4112 the side of the test pane facing away from the flame should not become hotter than 160° C. The gel should thus as far as possible not melt away at 160° C.

The test results are shown in Table 2.

TABLE 2

| Sample | Observation |
|---|---|
| A | moderate, but distinct melting and flowing away of the gel |
| B | somewhat less flowig away of the gel than in the case of A |
| C | significantly greater melting away than in the case of A |
| I | significantly less and more viscous flowing away than in the case of A |
| K | no melting away, but only softening of the gel |
| L | no melting away, only slight softening of the gel |
| M | no melting away, no softening of the gel observed |
| N | gel cracks without melting |

The samples A and B correspond to the prior art, sample C is for comparative purposes, the samples I to N correspond to fire-resistant gels according to the invention.

Looking at Tables 1 and 2 together, it can be seen that short gelling times together with a low melting tendency at 160° to 165° C. is achieved only by fire-resistant gels having a composition according to the invention.

Example 4

Samples A and I to N obtained as described in Example 2 were each heated to 500° C. in test tubes. All samples gave fine-pored intumescence foams. The samples I to N foamed less strongly than the sample A.

Example 5

Fire-resistant glass according to the invention and comparative testing in the fire test Three-pane composites sealed with silicone sealant and having the dimensions 50×50×1.5 cm were produced and fixed vertically between two steel plates. The structure of the composite was: 3 mm float glass/3 mm intermediate space/3 mm float glass/3 mm intermediate space/3 mm float glass.

a) The intermediate spaces of the composite were filled with the gel former corresponding to the sample A from Example 2 prior to gelation (comparative experiment).

b) The intermediate spaces of a second composite were filled with the gel former corresponding to the sample L from Example 2 prior to gel formation (according to the invention).

Both composites were, in fixed form, introduced horizontally into an oven and heated for 20 hours at 90° C. They were then allowed to cool over a period of 10 hours. The fire-resistant glass thus produced was clear and transparent. Owing to the mechanically stable gel formed it also did not tend to deform as a result of hydrostatic pressure of the fillings.

A 50-cycle alternating temperature storage test (10 hours at each of −10° C., room temperature and +80° C.) showed no deterioration of the glass composites.

Comparison:

The two composites 5a) and 5b) were, after storage for 2 months at room temperature, installed in a small-fire furnace operated in accordance with DIN 4102 using the standard temperature curve. The flame test was then commenced. In both cases, the glass pane facing the flame cracked after from 1 to 2 minutes. After about 3 minutes opacification of the pane could be clearly seen in each case. After 26 minutes, melting away and the formation of floating bubbles could be seen in the lower region of the pane on the side facing away from the flame in the case of 5a), after 41 minutes the contents of the lower intermediate space facing away from the flame had partly run out, but it began to partly refill as a result of intumescent foaming of the filling. The average temperature of the composite 5a) reached values of above 180° C. after 44 minutes.

In the case of composite 5b), increasingly fine bubbles appeared in the gel layer after 5 minutes, without noticeable flowing or running-out processes, the bubbles increasingly assuming the character of a fine-pored foam over the entire test time. From a test time of about 18 minutes, this foaming process also occurred in the second gel layer. Even after from 25 to 30 minutes burning time no pronounced heat spots could be seen on the surface of the pane. After 53 minutes, the outer surface of the pane reached an average temperature of 180° C. The composite 5b) was now filled with a fine-pored foam in the manner of a cushion.

After 120 minutes burning time, both composite panes still represented complete closure of a space. The test was then stopped and the front facing the flame was assessed after cooling.

In the case of 5a), it was found that certain amounts of the original gel filling had sunk downwards out of the broken panes and had vitrified there. On the intact parts of the glass panes, the remaining layer of the readily wetting glass melt had expanded with ceramicization to give a foam material.

In the case of 5b), it was found that almost no material had sunk down or run out into the fire space and that the entire surface facing the flame represented a type of fine-pored foam cushion of ceramicized material. This enables the closure of a space to be maintained over a long time.

These fire tests show the significantly improved suitability of the gels 5b) according to the invention for fire-resistant intermediate gel layers in fire-resistant glass.

What is claimed is:

1. A gel former containing a) an acid aluminum phosphate and b) a reaction product of boric acid with an alkanolamine, in which a) and b), calculated as solids, are present in a weight ratio of from 100:95 to 100:0.5 wherein the said gel former additionally contains one or more alkali metal compounds in an atomic ratio of aluminum to alkali metal of 1:1.3–2.5.

2. A gel former of claim 1, in which the acid aluminium phosphate is in the form of a reaction product with from 0.1 to 4 mol of an alkanolamine per mol of aluminium phosphate.

3. A gel former of claim 1, which further comprises from 0.5 to 85% by weight water the said gel former has atomic or molar ratios of aluminum to borate to phosphorus to alkanolamine to alkali metal of: 1:1.2–1.8:2.7–3.3:2.7–3.3:1.4–2.21; the gel former being prepared from the reaction components of aluminum hydroxide, orthophosphoric acid, orthoboric acid, monoethanolamine and sodium hydroxide.

4. A gel former of claim 1, which is prepared using a) aluminum hydroxide and another aluminum compound selected from the group consisting of aluminum oxides, hydrated aluminum oxides, aluminum salts of volatile acids and aluminum borates, b) orthophosphoric acid and another phosphorous compound selected from the group consisting of dehydrated forms of orthophosphoric acid, phosphorus oxides, phosphonic acids, phosphinic acids, phosphoric esters and salts of phosphoric acid, c) orthoboric acid and another boron compound selected from the group consisting of dehydrated forms of orthoboric acid, boron oxides, ammonium borates and alkanolamine borates, d) monoethanolamine in addition to one or both of diethanolamine and triethanolamine, and e) alkali metal hydroxides and another alkali metal compound selected from the group consisting of oxides, carbonates, bicarbonates, formates, acetates, alkoxides, borates and aluminates.

5. A gel former of claim 1, which contains one or more additions of surfactants, bonding agents, colorants, pore nucleus formers, fillers, light protection agents, antioxidants and reinforcers.

6. A gel former of claim 1, which is prepared using a) aluminum hydroxide or an aluminum compound selected from the group consisting of aluminum oxides, hydrated aluminum oxides, aluminum salts of volatile acids and aluminum borate, b) orthophosphoric acid or a phosphorous compound selected from the group consisting of dehydrated forms of orthophosphoric acid, phosphorus oxides, phosphonic acids, phosphinic acids, phosphoric esters and salts of phosphoric acid, c) orthoboric acid or a boron compound selected from the group consisting of dehydrated forms of orthoboric acid, boron oxides, ammonium borates and alkanolamine borates, d) monoethanolamine or one or both of diethanolamine and triethanolamine and e) an alkali metal hydroxide or alkali metal compound selected from the group consisting of oxides, carbonates, bicarbonates, formates, acetates, alkoxides, borates and aluminates.

7. A process for preparing a gel former of claim 1, where a preproduct containing a) an acid aluminium phosphate and b) a reaction product of boric acid with an alkanolamine is first prepared, where a) and b), calculated as solids, are present in a weight ratio of from 100:50 to 100:0.5, in which process then an alkali metal compound in the desired amount in the form of a from 50 to 70% strength by weight solution is added to this preproduct at from 10° to 100° C.

8. The process of claim 7, in which the preproduct is prepared by first reacting an aluminium compound capable of forming aluminium phosphate and a phosphorus compound capable of forming aluminium phosphate in the desired atom ratio of aluminium to phosphorus in the presence of water at from 70° to 120° C. to give an aluminium phosphate solution having a solids content of at least 40% by weight, allowing this solution to stand for at least 4 hours at from 10° to 40° C., separately therefrom combining a boron compound capable of forming an alkanolamine salt and an alkanolamine in the desired ratio of boron atoms to alkanolamine molecules in the presence of water, admixing this solution with the aluminium phosphate solution in the desired ratio and heating moderately.

9. Fire-resistant gel, which is a gel former according to claim 1 in gelled form.

10. A process for preparing a fire-resistant gel of claim 9, which comprises heating the gel former for from 30 minutes to 2.5 hours at from 50° to 120° C.

* * * * *

UNITED STATES PATENT AND TRADEMARK OFFICE
CERTIFICATE OF CORRECTION

PATENT NO. : 5,709,821
DATED      : January 20, 1998
INVENTOR(S): von Bonin, et al.

It is certified that error appears in the above-indentified patent and that said Letters Patent is hereby corrected as shown below:

Col. 8, line 64   Delete " 1:2.2-1.8:2.7-3.3:2.7-3.3:1.4-2.21; " and substitute -- 1:1.2-1.8:2.7-3.3:2.7-3.3:1.4-2.2: --

Signed and Sealed this

Fifteenth Day of May, 2001

Attest:

NICHOLAS P. GODICI

Attesting Officer        Acting Director of the United States Patent and Trademark Office